United States Patent
McCollum et al.

(10) Patent No.: US 9,563,007 B2
(45) Date of Patent: Feb. 7, 2017

(54) MODULAR LIGHT-EMITTING PANEL ASSEMBLY

(71) Applicant: Rambus Delaware LLC, Brecksville, OH (US)

(72) Inventors: Timothy A McCollum, Avon Lake, OH (US); Jeffery R Parker, Richfield, OH (US); Gregg M Podojil, Cleveland, OH (US)

(73) Assignee: Rambus Delaware LLC, Brecksville, OH (US)

( * ) Notice: Subject to any disclaimer, the term of this patent is extended or adjusted under 35 U.S.C. 154(b) by 302 days.

(21) Appl. No.: 14/352,844

(22) PCT Filed: Sep. 28, 2012

(86) PCT No.: PCT/US2012/057837
§ 371 (c)(1),
(2) Date: Apr. 18, 2014

(87) PCT Pub. No.: WO2013/058961
PCT Pub. Date: Apr. 25, 2013

(65) Prior Publication Data
US 2014/0286052 A1    Sep. 25, 2014

Related U.S. Application Data

(60) Provisional application No. 61/549,489, filed on Oct. 20, 2011.

(51) Int. Cl.
*F21V 8/00* (2006.01)

(52) U.S. Cl.
CPC ........... *G02B 6/0075* (2013.01); *G02B 6/0078* (2013.01)

(58) Field of Classification Search
CPC .............................. G02B 6/0075; G02B 6/0078
(Continued)

(56) References Cited

U.S. PATENT DOCUMENTS

| 6,580,447 B2 | 6/2003 | Shimizu et al. |
| 6,752,505 B2 | 6/2004 | Parker et al. |

(Continued)

FOREIGN PATENT DOCUMENTS

| EP | 1930947 A1 | 6/2008 |
| EP | 1988331 | 11/2008 |

(Continued)

OTHER PUBLICATIONS

PCT International Preliminary Report on Patentability dated May 1, 2014 (Chapter I) in International Application No. PCT/US2012/057837. 11 pages.

(Continued)

*Primary Examiner* — Anabel Ton
(74) *Attorney, Agent, or Firm* — Renner, Otto, Boisselle & Sklar, LLP

(57) ABSTRACT

A modular light-emitting panel assembly has first and second light guides edge lit by respective light sources. Each light guide has a light input edge, opposed side edges, opposed major surfaces and a pattern of light extracting elements at at least one of the major surfaces. The light guides are juxtaposed with a side edge of the first light guide abutting a side edge of the second light guide at a seam and with the major surfaces nominally coplanar. Various embodiments of the panel assembly additionally include respective structures that reduce visibility of the seam when the light sources illuminate the panel assembly.

20 Claims, 12 Drawing Sheets

(58) Field of Classification Search
USPC .................................................. 362/616, 613
See application file for complete search history.

(56) References Cited

U.S. PATENT DOCUMENTS

| | | | |
|---|---|---|---|
| 8,870,433 B2* | 10/2014 | Um | G02B 6/0078 362/616 |
| 2006/0203464 A1 | 9/2006 | Kang et al. | |
| 2008/0205080 A1* | 8/2008 | Erchak | G02B 6/0085 362/613 |
| 2009/0122227 A1* | 5/2009 | Hong | G02F 1/133611 349/64 |
| 2011/0013421 A1 | 1/2011 | Um | |
| 2011/0157918 A1* | 6/2011 | Liu | G02B 6/0021 362/613 |
| 2012/0019742 A1* | 1/2012 | Chang | G02B 6/0038 349/65 |
| 2013/0308339 A1* | 11/2013 | Woodgate | G02B 6/0078 362/609 |

FOREIGN PATENT DOCUMENTS

| | | |
|---|---|---|
| JP | 2001092370 | 4/2001 |
| JP | 2010232101 | 10/2010 |
| JP | 2011146207 | 7/2011 |

OTHER PUBLICATIONS

International Search Report and Written Opinion from corresponding International Application No. PCT/US2012/057837, mailed on Mar. 15, 2013.
Co-pending U.S. Appl. No. 15/052,081 and pending claims.

* cited by examiner

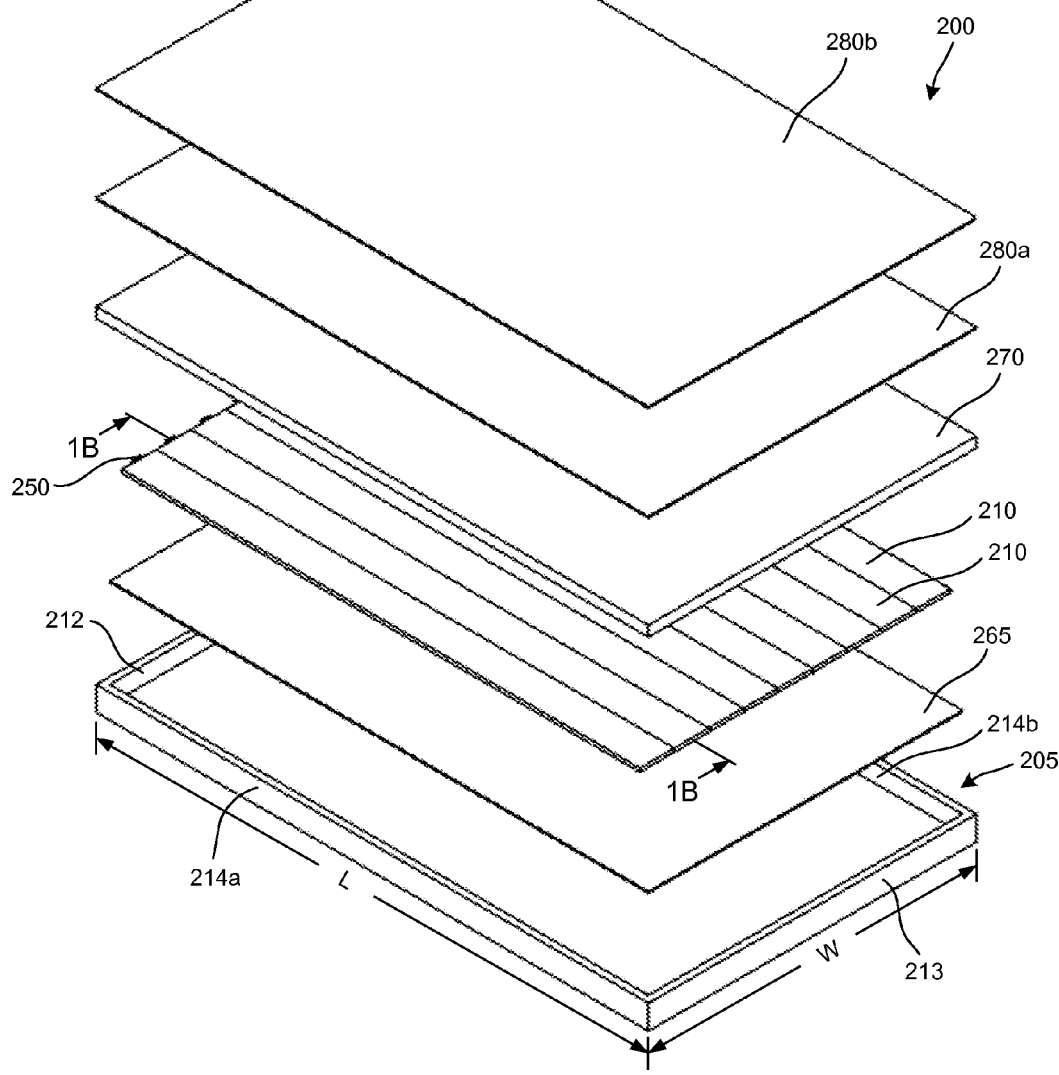
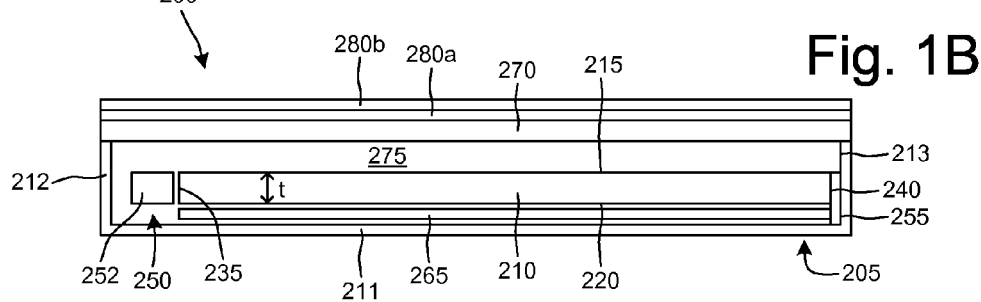

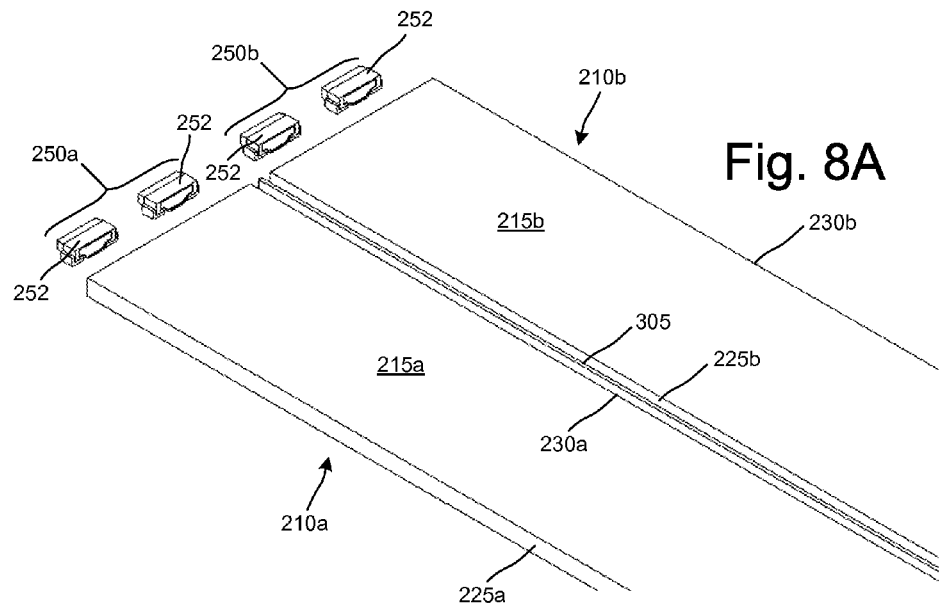
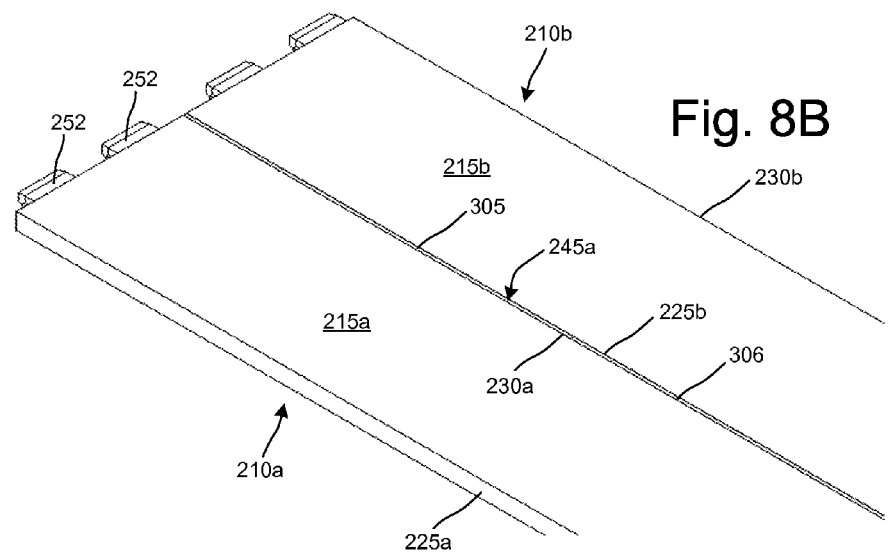

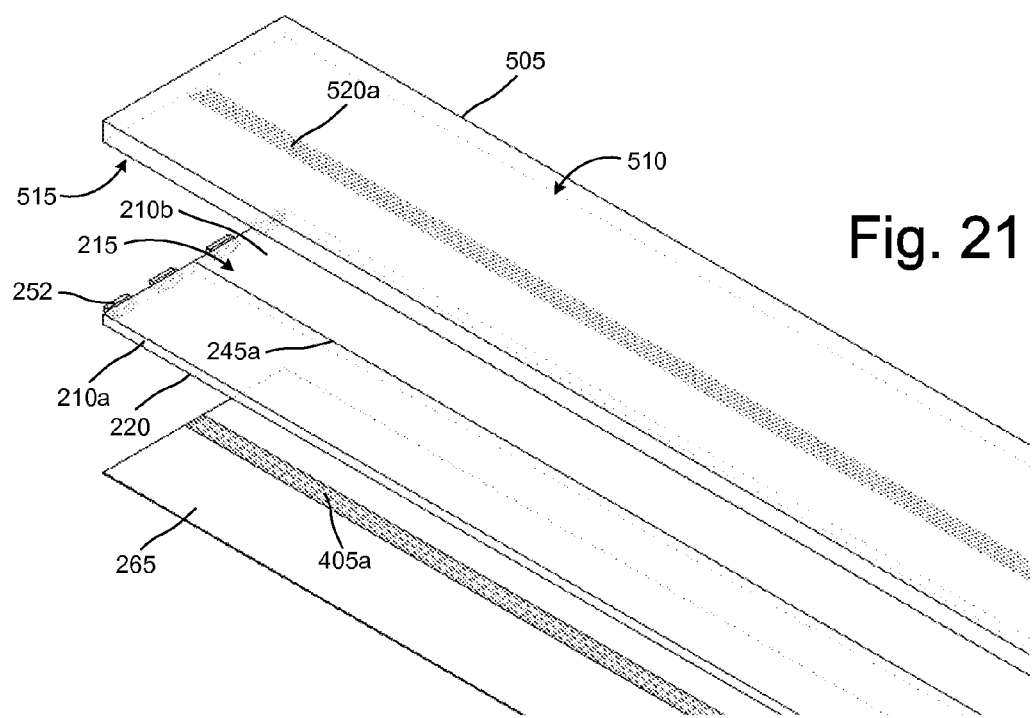

MODULAR LIGHT-EMITTING PANEL ASSEMBLY

RELATED APPLICATION DATA

This application claims the benefit of U.S. Patent Application No. 61/549,489 filed Oct. 20, 2011, the disclosure of which is incorporated herein by reference in its entirety.

BACKGROUND

Modular light-emitting panel assemblies having multiple edge-lit light guides arranged side-by-side are known. However, the light output from known modular light-emitting panel assemblies typically has a non-uniform intensity profile, especially at the seams where the light guides abut.

BRIEF DESCRIPTION OF THE DRAWINGS

FIG. 1A is an exploded perspective view showing an example of an embodiment of a modular light-emitting panel assembly.

FIG. 1B is a cross-sectional view showing the modular light-emitting panel assembly shown in FIG. 1A.

FIGS. 8A and 8B are exploded perspective and perspective views, respectively, showing part of an example of a simplified embodiment of a modular light-emitting panel assembly in which a thin strip of film is interposed between adjacent side edges of the light guides to reduce visibility of the seam when the panel assembly is illuminated.

FIG. 21 is a perspective view showing part of an example of another simplified embodiment of a modular light-emitting panel assembly including a transparent plate having a visibility-reducing pattern in alignment with the seam juxtaposed with the front major surfaces of light guides, and a back reflector having a visibility-reducing pattern in alignment with the seam juxtaposed with the back major surfaces of the light guides to reduce visibility of the seam when the panel assembly is illuminated.

DETAILED DESCRIPTION

Figure 2A:
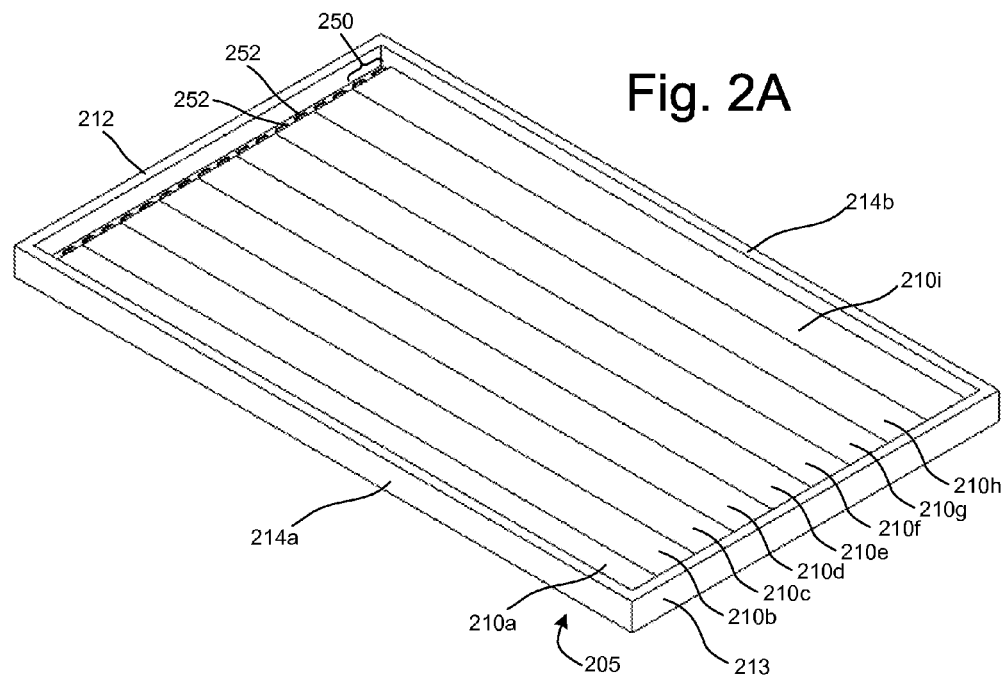
FIGS. 2A and 2B are perspective and plan views, respectively, showing the modular light-emitting panel assembly shown in FIG. 1A with the diffuser plate and the optical films removed.

FIGS. 1A and 1B are exploded perspective and cross-sectional views, respectively, showing an example of an embodiment of a modular light-emitting panel assembly 200 that includes light guides. Modular light-emitting panel assembly 200 includes a tray 205 that houses light guides 210. Referring to FIG. 1A, the tray 205 has a base 211, a first side wall 212 and a second side wall 213 opposite the first side wall. First side wall 212 and second side wall 213 extend from base 211. Tray 205 additionally has a third side wall 214a and a fourth side wall 214b, opposite the third side wall. Third side wall 214a and fourth side wall 214b also extend from base 211. In the example shown, base 211, first side wall 212, second side wall 213, third side wall 214a, and fourth side wall 214b extend orthogonally to base 211. Together, the first and second side walls 212, 213 define the width W of tray 205 between them. Similarly, the third and fourth side walls 214a,b define the length L of tray 205 between them.

In the illustrated embodiment, modular light-emitting panel assembly 200 includes nine light guides 210a-i. In this disclosure, reference numerals without appended letters refer to corresponding elements generically whereas reference numerals with appended letters refer to specific ones of the corresponding elements. Each light guide 210 can take the form of, and can include one or more of the features of the light guides described and illustrated in U.S. Pat. No. 6,712,481. Each light guide 210 has at least one light output surface that constitutes at least part of one of the major surfaces of the light guide. Each light guide 210 additionally includes a pattern of light extracting optical elements (not shown) that extract light propagating within the light guide through each light output surface. Although the illustrated embodiment of modular light-emitting panel assembly 200 includes nine light guides 210, other embodiments of panel assembly 200 have more or fewer than nine light guides.

As described above, each of the light guides 210 is generally planar in shape and has a greater cross-sectional width than thickness. Additionally, each of the light guides 210 has a greater length than width. With reference to FIGS. 1B and 2B, a first light guide 210a has a front major surface 215a and a back major surface 220a opposite the front major surface that define the thickness t of the light guide between them. Light guide 210a additionally has a first side edge 225a and a second side edge 230a opposite first side edge 225a that define the width W of light guide 210a between them. Light guide 210a additionally has a light input edge 235a and an end edge 240a opposite light input edge 235a that define the length L of light guide 210a between them. The remaining light guides 210b-i of modular light-emitting panel assembly 200 have the same structure as light guide 210a and will not be individually described.

Figure 3:
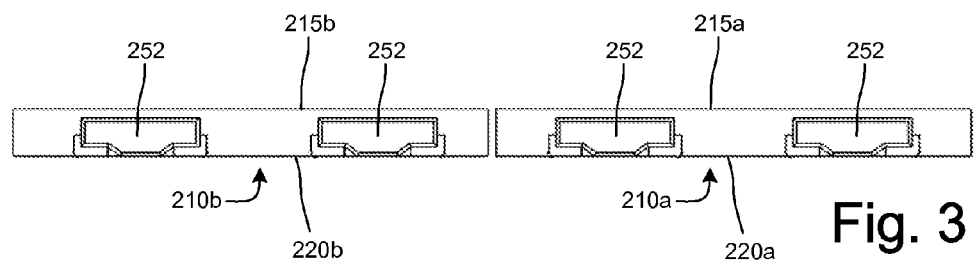
FIG. 3 is an exploded front view showing an example of two adjacent light guides having substantially planar side edges orthogonal to the major surfaces of the light guides.

In the embodiment shown, the first and second side edges 225, 230 of each of the light guides 210 are substantially planar and are oriented substantially orthogonally to the front and back major surfaces 215, 220, as shown in FIG. 3. In other embodiments, the first and second side edges 225, 230 of each of the light guides 210 are configured differently, as will be described below.

In the embodiment of modular light-emitting panel assembly 200 shown in FIGS. 1A and 1B, each of the light guides 210 has a uniform thickness along its length. In another embodiment, shown in FIG. 4, a modular light-emitting panel assembly 200' includes light guides 210' each having a thickness t that decreases with increasing distance from its light input edge 235'.

Figure 2B:
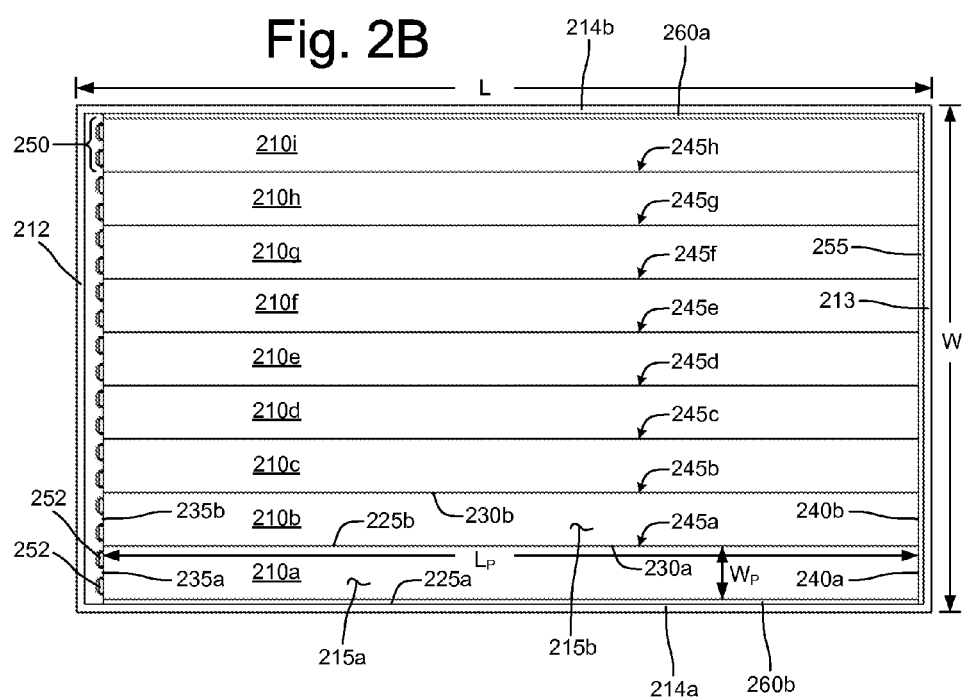

In the embodiment shown in FIGS. 1A, 1B, 2A and 2B, light guides 210 are arranged in a side-by-side relationship to each other, such that the first side edge 225 of one of the light guides abuts the second side edge 230 of an adjacent light guide such that the front major surfaces 215 of the light guides 210 are coplanar and collectively form a single, step-less front major surface of modular light-emitting panel assembly 200. In some embodiments, light guides 210 are positioned such that the side edges of adjacent light guides that abut are in contact with each other. Together, the side edges of adjacent light guides that abut form a seam between the adjacent light guides. For example, as shown in FIGS. 2A and 2B, the first side edge 225b of second light guide 210b abuts the second side edge 230a of first light guide 210a. The first side edge 225b and second side edge 230a collectively form a seam 245a between first light guide 210a and second light guide 210b. The abutting side edges of the other adjacent light guides 210 form seven other seams 245b-h in the panel assembly 200.

Figure 5:
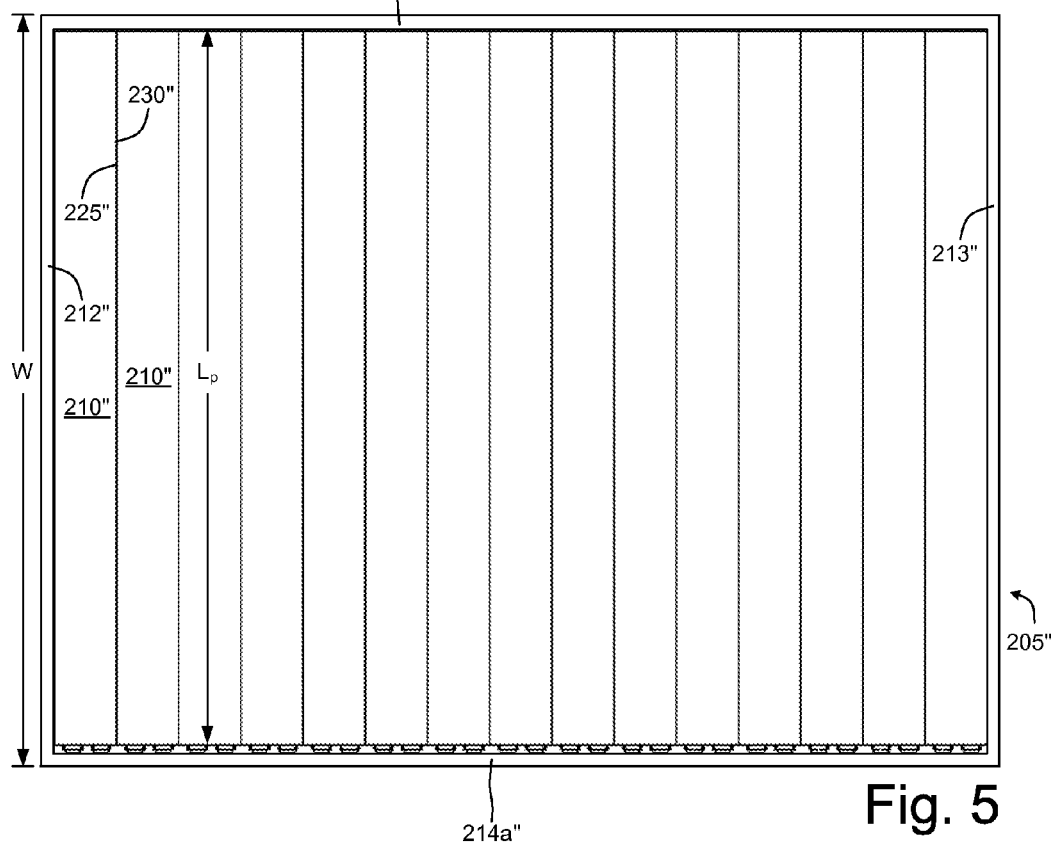
FIG. 5 is a plan view showing an example of another embodiment of a modular light-emitting panel assembly.

In the embodiment shown, light guides 210 are installed in tray 205 with the first and second side edges 225, 230 of the light guides parallel to the third side wall 214a and the fourth side wall 214b of the tray. The length $L_p$ of the light guides 210 is similar to, but less than, the length L of tray 205, as shown in FIG. 2B. In another embodiment, shown in FIG. 5, light guides 210" are installed in tray 205 with the first and second side edges 225", 230" of the light guides 210" parallel to the first and second side walls 212", 213" of the tray. In this embodiment, the length $L_p$ of the light guides 210" is similar to, but typically slightly less than, the width W of the tray.

In another embodiment (not shown), the length of each of the light guides is slightly less than one-half of the length L of tray 205. Each of the light guides has a light source (described in more detail below) at its light input edge 235. The light guides are installed in the tray in pairs, with the light source of one light guide of each pair adjacent the first side wall 212 of tray 205, and with the light source of the other of light guide of each pair adjacent the second side wall 213 of the tray. In another embodiment (not shown), the length of each of the light guides is slightly less than one-half of the width W of tray 205. Each of the light guides has a light source at its light input edge 235. The light guides are installed in the tray in pairs, with the light source of one light guide of each pair adjacent the third side wall 214a of tray 205, and with the light source of the other of light guide of each pair adjacent the fourth side wall 214b of the tray.

In modular light-emitting panel assembly 200, each of the light guides 210 is edge lit by a respective light source 250. Light source 250 is optically coupled to the light input edge 235 of the light guide such that light emitted by the light source enters the light guide and travels along the light guide by total internal reflection at the major surfaces. Light source 250 includes solid-state light emitters such as light-emitting diodes (LEDs), laser diodes, and organic LEDs (OLEDs). In an embodiment in which light source 250 includes LEDs, the LEDs may be top-fire LEDs or side-fire LEDs, and may be broad-spectrum LEDs (e.g., emit white light), LEDs that emit light of a desired color (e.g., red light, green light, blue light, or ultraviolet light, infrared light), or a mixture of broad-spectrum LEDs and LEDs that emit monochromatic light of a desired color. In one embodiment, light source 250 emits light with no operably-effective intensity at wavelengths greater than 500 nanometers (nm), i.e., the light source emits light at wavelengths that are predominantly less than 500 nm. In such embodiments, phosphors (not shown) convert at least part of the light emitted by light source 250 to longer-wavelength light. Light source 250 may constitute part of a light source assembly (not shown) that also includes structural components (e.g., a printed circuit board (PCB)) (not shown) to retain light source 250 and to locate the light source relative to respective light guide 210. The light source assembly may additionally include circuitry, power supply and/or electronics for controlling and driving light source 250, a heat sink, and other appropriate components.

Figure 6:
FIG. 6 is a plan view showing an example of another embodiment of a light-emitting panel assembly in which the light source for each light guide has a single solid-state light emitter.
Figure 7:
FIG. 7 is a plan view showing an example of another embodiment of a modular light-emitting panel assembly in which the light source for each light guide has three solid-state light emitters.

In the embodiment shown in FIGS. 1A, 1B, 2A and 2B, the light source 250 for each light guide 210 in modular light-emitting panel assembly 200 is composed of two solid-state light emitters 252. The solid-state light emitters 252 constituting the respective light source 250 are positioned adjacent the light input edge 235 of each light guide 210 and are configured to direct light into the light guide 210 within a range of angles such that the light propagates along the light guide 210 by total internal reflection at the front and back major surfaces 215, 220. The light input edge 235 of each light guide 210 may be configured to spread the light received from the solid-state light emitters 252 across the width W of each light guide 210. In an example, each input edge 235 includes refractive surfaces or a lens array configured to spread the light from the solid-state light emitter 252 to a greater extent widthwise than heightwise. Additionally or alternatively, light input edge 235 can include one or more optically polished areas, anti-reflection areas, textured areas, lensed areas, prismatic areas or any combination of the above to condition the light entering the light guide. Although in the embodiment of panel assembly 200 shown in FIGS. 1A, 1B, 2A, 2B, light source 250 for each light guide 210 is composed of two solid-state light emitters 252, other configurations of light source 250 are possible. In the embodiment shown in FIG. 6, the light source 250 for each of the light guides 210 is composed of a single solid-state light emitter 252. Single solid-state light source 252 is typically an LED that generates white light. In the embodiment shown in FIG. 7, the light source 250 for each of the light guides 210 is composed of three solid-state light emitters 252. In an example, the solid-state light emitters are LEDs that respectively generate red, green and blue light. Solid-state light emitters 252 may be operated simultaneously or sequentially. In other embodiments (not shown), the light source 250 for each of the light guides 210 is embodied as more than three solid-state light emitters, or, as mentioned above, by different combinations of LEDs or other solid-state light emitters.

Referring again to FIGS. 1B and 2B, modular light-emitting panel assembly 200 also includes an end reflector 255 and two side reflectors 260a,b. End reflector 255 faces the end edges 240 of light guides 210. Side reflector 260a faces the first side edge 225a of first light guide 210a. Side reflector 260b faces the second edge 230i of the ninth light guide 210i. Additionally, the panel assembly 200 includes a back reflector 265 facing the back major surfaces 220 of light guides 210, as shown in FIG. 1B.

In the example shown, end reflector 255, side reflectors 260a, 260b and back reflector 265 are each embodied as separate components. End reflector 255 is interposed between the end edges 240 of light guides 210 and the second side wall 213 of tray 205. Side reflector 260a is interposed between the side edge 225a of light guide 210a and the third side wall 214a of tray 205. Side reflector 260b is interposed between the side edge 230i of light guide 210i and the fourth side wall 214b of tray 205. Back reflector 265 is interposed between the back major surfaces 220 of light guides 210 and the base 211 of tray 205.

In another embodiment (not shown), one or more of end reflector 255, side reflectors 260a, 260b, and back reflector 266 are integral with tray 205. In an example, the internal surfaces of the tray 205 are made reflective or partially reflective to act as end reflector 255, side reflectors 260a, 260b, and/or back reflector 265. In another embodiment (not shown), one or more of end reflector 255, side reflectors 260a, 260b, and back reflector 266 are integral with portions of light guides 210. In an example, the above-mentioned reflectors are provided by reflective coatings on the end edges 240 and back major surfaces 220 of all the light guides 210, and on the side edge 225a of light guide 210a and the side edge 230i of light guide 210i.

Figure 4:
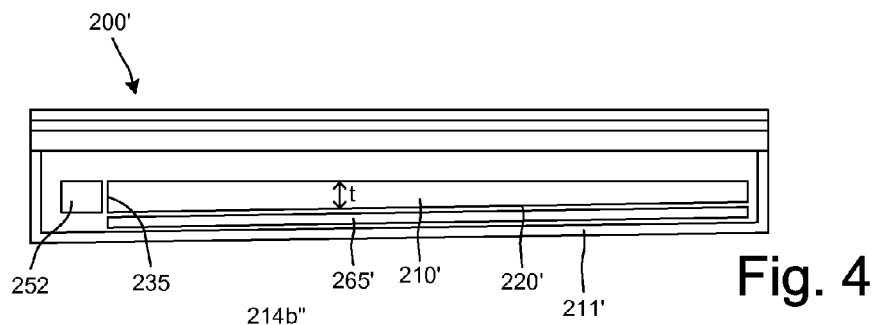
FIG. 4 is a cross-sectional view showing an example of another embodiment of a modular light-emitting panel assembly having tapered light guides.

In the embodiment shown in FIG. 4, a tray 205' has a base 211' that is angled to correspond to the taper of light guides 210'. In this embodiment, back reflector 265' rests on base 211' to ensure that it sits flush against the back major surfaces 220' of light guides 210'.

In the embodiment shown in FIGS. 1A, 1B, 2A, 2B, modular light-emitting panel assembly 200 additionally includes a diffuser 270 supported by the third and fourth side walls 214a, 214b of tray 205 parallel to the front major surfaces 215 of light guides 210, as shown in FIG. 1A. Diffuser 270 is configured as a film or a plate. Diffuser 270 is configured to diffuse the light extracted from light guides 210 to provide a smoother light output distribution from panel assembly 200. As shown in FIG. 1B, diffuser 270 is spaced from light guides 210 to provide a light mixing space 275 between the light guides and the diffuser. The size of light mixing space 275 in a direction orthogonal to the front major surfaces 215 of light guides 210 is made sufficient to allow for any needed color mixing of the light extracted from the panel members to occur. Additionally or alternatively, as discussed in more detail below, the size of light mixing space 275 can be made sufficient to reduce the visibility of the seams 245 between adjacent ones of the light guides. Optical layers 280a, 280b are located adjacent diffuser 270. Optical layers 280a, 280b are configured to redirect the light transmitted through the diffuser in a predetermined manner. The optical layers are typically configured as optical films. One suitable example of an optical film is Vikuiti® Brightness Enhancement Film sold by 3M Company, St. Paul, Minn., USA. In other embodiments (not shown), modular light-emitting panel assembly 200 has no optical layers, one optical layer, or more than two optical layers. Examples of optical layers include prismatic films, lenticular films, polarizer films, reflective polarizer films, diffuser films, or other films or plates that redirect, recycle or diffuse light.

When light sources 250 edge light modular light-emitting panel assembly 200, the light extracted through the front major surfaces 215 of light guides 210 has an intensity profile, i.e., a measure of intensity with position on the combined front major surfaces of the light guides. Substantial positional variations in intensity can occur at the seams 245 between adjacent light guides. A sharp spike in intensity caused by unwanted light emitted from the seam causes the intensity variation at the seam. A spike in intensity at a seam 245 is the result of unwanted light extracted from adjacent light guides 210 in the vicinity of the seam. Imperfections in the side edges 225, 230 of light guides 210, and in the corners between the side edges and the major surfaces 215, 220 of the light guide extract unwanted light from the light guide. At least some of the unwanted light is directed towards the observer and may be observed by the observer as an intensity spike.

In some applications, visibility of seams 245 is acceptable, or even desirable. However, in most applications (e.g., when the panel assembly is to be used as a backlighting assembly for a liquid crystal display (LCD)), visibility of seams 245 is undesirable. Reduction in the visibility of intensity variations at the seams is desirable in such applications. To simplify the following description, visibility of intensity variations at the seams between adjacent light guides will be referred to herein as visibility of the seams. Visibility of the seams can be reduced by increasing the size of light mixing space 275. However, increasing the size of the light mixing space increases the thickness of the panel assembly 200, which is undesirable as current market demand is for thin panel assemblies. Accordingly, the various embodiments of modular light-emitting panel assembly 200 disclosed herein are each configured to reduce the visibility of the seams while using a light mixing space 275 small enough for the panel assembly to satisfy market demand for thin panel assemblies. Configurations of modular light-emitting panel assembly 200 that reduce the visibility of the seams when the panel assembly is illuminated will now be described.

In the following descriptions of various embodiments of modular light-emitting panel assembly 200, the drawings show and the description describes a simplified embodiment of panel assembly 210 composed of only two light guides 210a, 210b to simplify the drawings and the description. Moreover, to enable the drawings to show more detail, only portions of light guides 210a, 210b adjacent their respective light sources 250a, 250b are shown. However, the drawings and description herein additionally apply to embodiments of panel assembly 200 having a greater number of light guides.

FIGS. 8A and 8B show part of an example of a simplified embodiment of modular light-emitting panel assembly 200 configured to reduce visibility of seams between adjacent light guides when the panel assembly is illuminated. FIG. 8A is an exploded view. FIG. 8B is a non-exploded view. In the embodiment shown in FIGS. 8A and 8B, a thin strip of film 305 is interposed between the adjacent side edges 230a, 225b of light guides 210a, 210b, respectively. Film 305 separates the side edges 230a, 225b of light guides 210a, 210b, respectively, from one another.

In one embodiment, film 305 is a diffuser film that diffuses unwanted light emitted from seam 245a towards the observer. Diffusing the unwanted light reduces the amount of the unwanted light directed towards the observer from the seam. Thus, film 305 embodied as a diffusing film performs the function of reducing the visibility of the seam. One suitable example of a diffuser film that can be used as film 305 in modular light-emitting panel assembly 200 is D114 SIII sold by Tsujiden Co., Ltd., Tokyo, Japan.

In another embodiment, film 305 is a light-absorbing film such as a neutral-density film. The light-absorbing film absorbs unwanted light emitted from seam 245a towards the observer, which reduces visibility of the unwanted light to the observer. Thus, film 305 embodied as a neutral-density film performs the function of reducing the visibility of the seam. One example of a neutral density film suitable for use as film 305 in panel assembly 200 is R210 ND sold by Lee Filters USA, Burbank, Calif., USA.

In another embodiment, film 305 is a prismatic film. The prismatic film is configured to redirect the unwanted light emitted from seam 245a towards the observer in other directions that reduce visibility of the unwanted light to the observer. Such directions are non-orthogonal to the major surfaces of the light guides. The prismatic film has grooves (not shown) and is installed between light guides 210a, 210b with the grooves orthogonal to the front major surface 215 of the light guides. With the groove orientation as described, the prismatic film redirects part of the unwanted light emitted from seam 245a along the seam and redirects another part of the unwanted light emitted from the seam back into the light guides. Redirected as just described, the unwanted light is less visible to the observer. Thus, film 305 embodied as a prismatic film performs the function of reducing the visibility of the seam. One example of a prismatic film suitable for use as film 305 in panel assembly 200 is BEF II 90/50 sold by 3M Company, St. Paul, Minn., USA.

In another embodiment, film 305 is a specularly-reflective or diffusely-reflective film. A reflective film reflects unwanted light emitted from seam 245a towards the observer in directions that reduce visibility of the unwanted light to the observer. Such directions are non-orthogonal to the major surfaces of the light guides. Thus, film 305 embodied as a reflective film performs the function of reducing the visibility of the seam. One example of a reflective film suitable for use as film 305 in panel assembly 200 is Vikuiti® ESR sold by 3M Company, St. Paul, Minn., USA. In some embodiments, film 305 is affixed to one or both of the abutted side edges 230a, 225b of light guides 210a, 210b, respectively.

Figure 9:
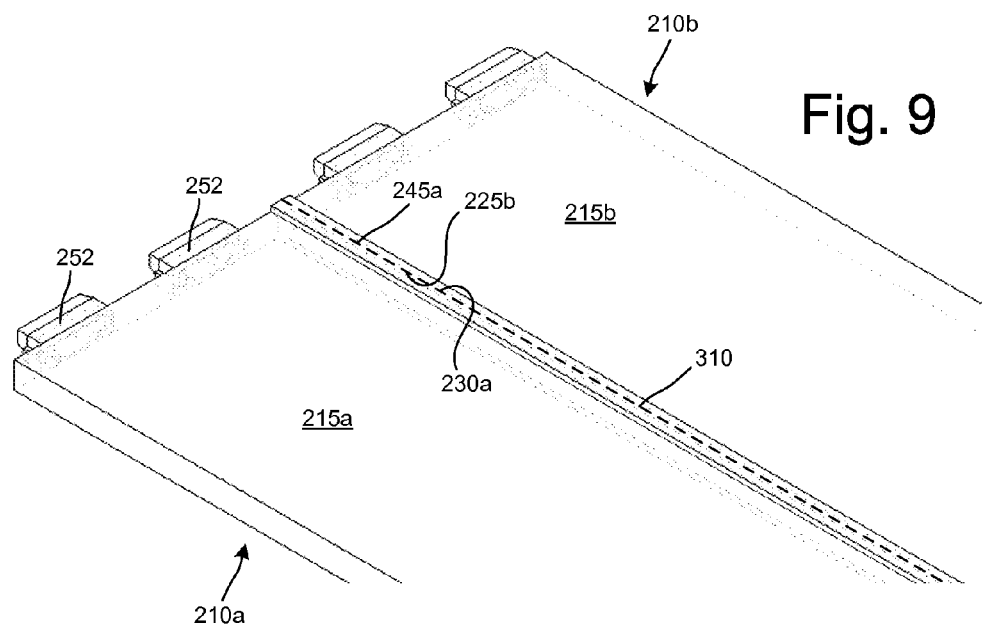
FIG. 9 is a perspective view showing part of an example of a simplified embodiment of a modular light-emitting panel assembly in which an elongate film strip covers the seam to reduce visibility of the seam when the panel assembly is illuminated.

FIG. 9 shows part of an example of another simplified embodiment of modular light-emitting panel assembly 200. In the embodiment shown, the adjacent side edges 230a, 225b of exemplary light guides 210a, 210b, respectively, abut at a seam 245a, and panel assembly 200 additionally includes an elongate strip of film covering seam 245. The strip of film will be referred to herein as a film strip 310. Film strip 310 is attached to one or both light guides 210 with its major surface parallel to the front major surface 215 of the light guides. In one embodiment, film strip 310 is a strip of any of the above-described diffuser films. Film strip 310 embodied as a strip of diffuser film redistributes unwanted light emitted from seam 245a towards the observer in other directions that reduce visibility of the unwanted light to the observer. Such directions are non-orthogonal to the major surfaces of the light guides. Thus, film strip 310 embodied as a diffuser film performs the function of reducing visibility of the seam.

In another embodiment, film strip 310 is a strip of any of the above-mentioned light absorbing films. Film strip 310 embodied as a strip of light absorbing film that absorbs unwanted light emitted from seam 245a towards the observer to reduce visibility of the unwanted light to the observer. Thus, film strip 310 embodied as a light-absorbing film performs the function of reducing visibility of the seam.

In another embodiment (not shown), panel assembly 200 includes a sheet of transparent film sized to cover the front major surfaces 215 of light guides 210a, 210b. The transparent film has an elongate opaque or diffusing region that covers a seam 245a and functions similarly to light absorbing or diffusing film strip 305. Thus, a transparent film that covers the light guides and has an elongate opaque or diffusing region covering seam 245a performs the function of reducing visibility of the seam. Moreover, in a non-simplified embodiment of panel assembly 200 having more than two light guides 210, the sheet of transparent film is sized to cover the front major surfaces 215 of all the light guides 210. The transparent film has multiple elongate opaque or diffusing regions. A respective one of the elongate opaque or diffusing regions covers each seam 245 and functions similarly to a respective absorbing or diffusing film strip 305. Thus, a transparent film that covers the light guides and has a respective elongate opaque or diffusing region covering each seam 245 performs the function of reducing visibility of the seam.

In another embodiment, film strip 310 is a strip of any of the above-mentioned prismatic films. Film strip 310 embodied as a strip of prismatic film redirects unwanted light emitted from seam 245a towards the observer to other directions that reduce visibility of the unwanted light to the observer. Such directions are non-orthogonal to the major surfaces 215 of the light guides 210. Thus, film strip 310 embodied as a prismatic film performs the function of reducing visibility of the seam. In an example in which the prismatic film is a 90° prismatic film, the grooves of the prismatic film face towards the front major surfaces 215 of the light guides 210.

In another embodiment, film strip 310 is a strip of any of the reflective films described above. Film strip 310 embodied as a strip of reflective film reflects unwanted light emitted from seam 245a towards the observer to other directions that reduce visibility of the unwanted light to the observer. Such directions are non-orthogonal to the major surfaces 215 of the light guides. Thus, film strip 310 embodied as a reflective film performs the function of reducing visibility of the seam.

In another embodiment, one or both the abutting side edges 225a, 225b of adjacent light guides 210 have a coating thereon. In one embodiment, the coating is an anti-reflective coating. The anti-reflective coating reduces the amount of light reflected by the side edges 225a, 225b of light guides 210 towards the observer as unwanted light. This reduces visibility of the unwanted light to the observer. Thus, an anti-reflective coating on one or both abutting side edges 225a, 225b performs the function of reducing visibility of the seam.

In another embodiment, the coating is a specularly-reflective or diffusely-reflective coating such as a silver or white reflective coating. The reflective coating reflects unwanted light emitted from seam 245 towards the observer in directions that reduce visibility of the unwanted light to the observer. Thus, a coating on one or both abutting side edges 225a, 225b performs the function of reducing visibility of the seam.

In another embodiment, one or both of the side edges 225a, 225b of adjacent light guides 210a, 210b includes refractive or refractive structures. Such structures reflect or refract unwanted light emitted from seam 245a towards the observer in directions that reduce visibility of the unwanted light to the observer. Thus, refractive or refractive structures on one or both abutting side edges 225a, 225b of light guides 210a, 210b perform the function of reducing visibility of the seam. In another embodiment, one or both of the side edges 225a, 225b of adjacent light guides 210a, 210b includes one or more optically polished areas, textured areas, lensed areas, prismatic areas or any combination thereof.

In another embodiment, the side edges 225a, 225b of adjacent light guides 210a, 210b are bonded together using an optical-grade adhesive or index-matched adhesive. The optical-grade adhesive has an index of refraction equal to that of the material of the light guides. Equal refractive indices include refractive indices that differ by up to ±0.1. One example of an optical-grade adhesive suitable for use with acrylic light guides is OP-21 sold by DYMAX Corporation, Torrington, Conn., USA. Other examples of an optical-grade adhesive include optically-clear silicone adhesives, including solvent-based and UV-curable adhesives. Bonding the adjacent side edges 225a, 225b of light guides 210 together with optical-grade adhesive or an index-matched adhesive reduces the amount of light reflected by the side edges towards the observer as unwanted light. This reduces visibility of the unwanted light to the observer. Thus, optical-grade adhesive or an index-matched adhesive bonding the adjacent side edges 225a, 225b of light guides 210 together performs the function of reducing visibility of the seam.

In some embodiments, modular light-emitting panel assembly 200 includes a light redirecting element adjacent seam 245a and configured to redirect unwanted light emitted from seam 245a towards the observer in directions that reduce visibility of the unwanted light to the observer. Thus, a light redirecting element adjacent seam 245a configured to redirect unwanted in directions that reduce visibility of the unwanted light to the observer performs the function of reducing visibility of the seam.

Figure 10A:
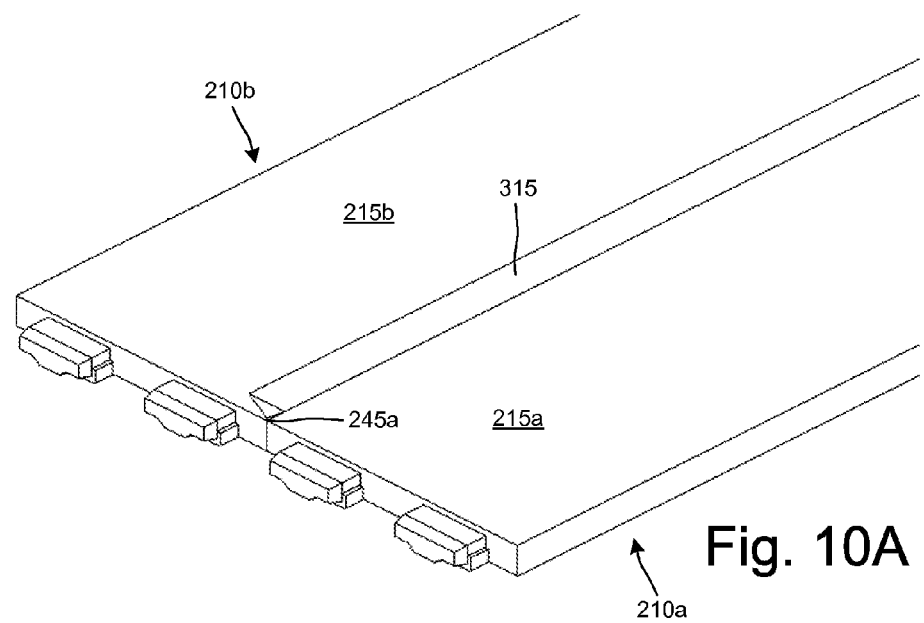
FIGS. 10A and 10B are perspective and front views, respectively, showing part of an example of a simplified embodiment of a modular light-emitting panel assembly that includes an example of a light redirecting element to reduce visibility of the seam when the panel assembly is illuminated.
Figure 10B:
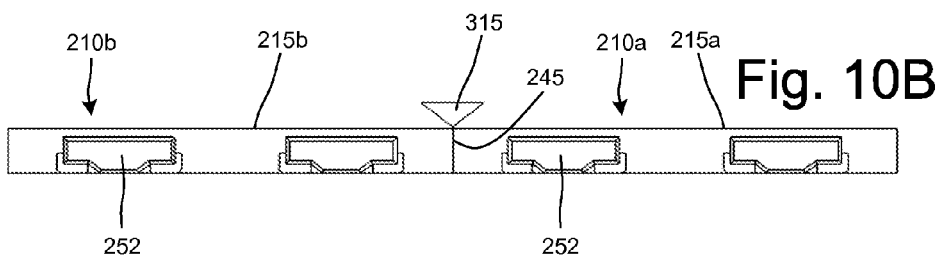

FIGS. 10A and 10B are perspective and front views, respectively, showing part of an example of another embodiment of a panel assembly that includes a light redirecting element 315. In the example shown, light redirecting element 315 is configured as an elongate triangular prism with the apex of the prism aligned with and facing seam 245a. Light redirecting element 315 is transmissive or opaque, and one or more of its surfaces may be reflective. In this embodiment, light redirecting element 315 reflects unwanted light emitted from seam 245 towards the observer. The unwanted light is incident on the two sides of the triangular prism facing the light guides 210a, 210b and is reflected by the prism in sideways directions that reduce visibility of the unwanted light to the observer. Thus, a light redirecting element embodied as an elongate triangular prism with its apex aligned with the seam performs the function of reducing visibility of the seam.

Figure 11:
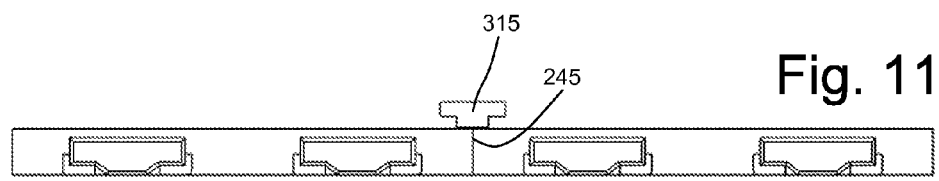
FIG. 11 is a front view showing part of an example of a simplified embodiment of a modular light-emitting panel assembly that includes another example of a light redirecting element to reduce visibility of the seam when the panel assembly is illuminated.
Figure 12:
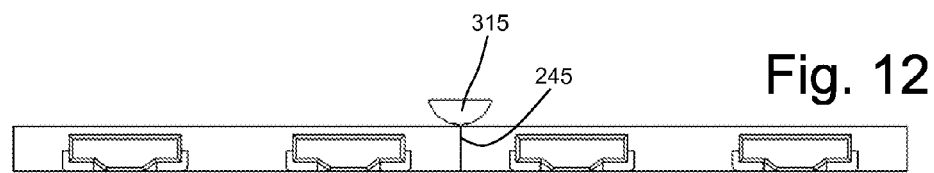
FIG. 12 is a front view showing an example of a simplified embodiment of a modular light-emitting panel assembly that includes another example of a light redirecting element to reduce visibility of the seam when the panel assembly is illuminated.
Figure 13:
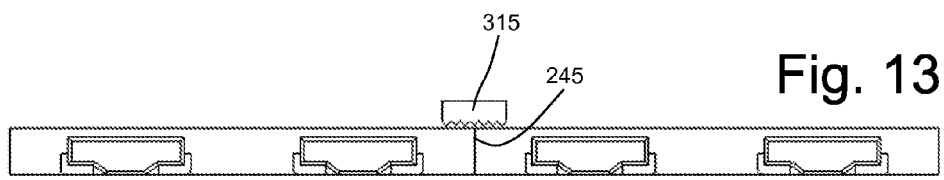
FIG. 13 is a front view showing an example of a simplified embodiment of a modular light-emitting panel assembly that includes another example of a light redirecting element to reduce visibility of the seam when the panel assembly is illuminated.
Figure 14:
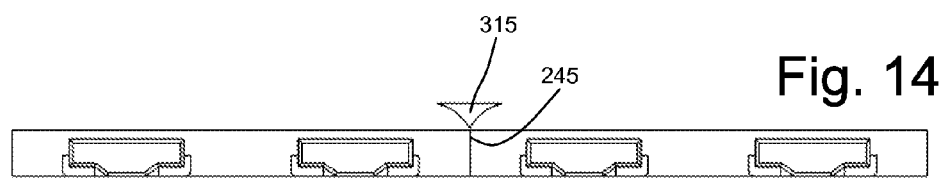
FIG. 14 is a front view showing an example of a simplified embodiment of a modular light-emitting panel assembly that includes another example of a light redirecting element to reduce visibility of the seam when the panel assembly is illuminated.
Figure 15:
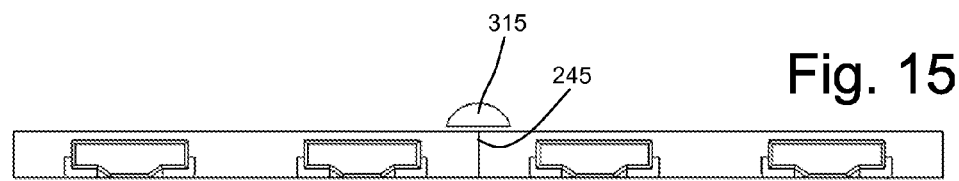
FIG. 15 is a front view showing an example of a simplified embodiment of a modular light-emitting panel assembly that includes another example of a light redirecting element to reduce visibility of the seam when the panel assembly is illuminated.

In other examples, light redirecting element 315 has a cross-sectional shape different from the triangular cross-sectional shape shown in FIGS. 10A and 10B. Examples of other cross-sectional shapes include a "T"-shaped cross-sectional shape where the base of the "T" shape faces seam 245a as shown in FIG. 11; a cross-sectional shape bounded by a chord and an intersecting arc of a curve, where the arc is aligned with and faces seam 245a as shown in FIG. 12; a rectangular cross-sectional shape having a grooved surface (e.g., a V-grooved surface or a lenticular grooved surface) that faces seam 245a as shown in FIG. 13; a triangular cross-sectional shape where the apex of the triangle is aligned with and faces seam 245a and the surfaces that form the apex are concave as shown in FIG. 14; and a cross-sectional shape bounded by a chord and an intersecting arc of a curve, where the chord is aligned with and faces seam 245a as shown in FIG. 15. In the example shown in FIG. 15, light redirecting element 315 is configured as a plano-convex cylindrical lens that refracts unwanted light emitted from seam 245a towards the observer in directions other than a direction orthogonal to the front surfaces 215 of light guides 210. In another embodiment, the light redirecting element 315 has a complex geometry that refracts and/or reflects unwanted light incident thereon in directions orthogonal to the front major surfaces 215 of light guides 210. Thus, a light redirecting element aligned with the seam and (a) having a T-shaped cross-sectional shape where the base of the "T" shape faces the seam, (b) having a rectangular cross-sectional shape with a grooved surface facing the seam, (c) having a triangular cross-sectional shape with straight or concave surfaces facing the seam, (d) having a cross-sectional shape bounded by a chord and an intersecting arc of a curve, where the arc or the chord faces the seam, or (e) having a complex geometry that refracts and/or reflects unwanted light in directions are non-orthogonal to the front major surfaces of the light guides performs the function of reducing visibility of the seam.

In the examples of light redirecting element 315 described above with reference to FIGS. 10A, 10B and 11-15, micro-optical elements configured to redirect unwanted light emitted from seam towards the observer in directions that reduce the visibility of the unwanted light to the observer may be located at one or more of the surfaces thereof. Micro-optical elements are features of well-defined shape that are small relative to the linear dimensions of the surface at which they are located. The smaller of the length and width of a micro-optical element is less than one-tenth of the larger of the linear dimensions of the surface, and the larger of the length and width of the micro-optical element is less than one-half of the smaller of the linear dimensions of the surface. The length and width of the micro-optical element are measured in a plane parallel to the surface for flat surfaces, or along a surface contour for non-flat surfaces. Thus, a light redirecting element aligned with the seam and having micro-optical elements at one of more its surfaces performs the function of reducing visibility of the seam.

The examples of light redirecting element 315 described above with reference to FIGS. 10A, 10B and 11-15 have a constant cross-sectional area along seam 245a. In other examples (not shown), the light redirecting element is tapered such that its cross-sectional area decreases with increasing distance from light input edges 235. In some embodiments, the light redirecting element tapers to a zero cross-sectional area part-way between the light input edges and end edges 240. Tapering light redirecting element 315 takes account of the way in which the intensity of the light within the light guides 210 decreases with increasing distance from the light input edges. Thus, a light redirecting element aligned with the seam and having a cross-sectional area that decreases with increasing distance from the light input edge performs the function of reducing visibility of the seam.

Although not illustrated in the figures, the light redirecting element 315 additionally includes any known supporting structure to support the light redirecting element 315 in contact with or slightly separated from the front major surfaces 215a, 215b of adjacent light guides 210a, 210b at the seam 245a between the adjacent light guides. In an example, light redirecting element 315 includes supports (not shown) that rest on the front major surfaces 215a, 215b of adjacent light guides 210a, 210b.

In one embodiment, the light redirecting element 315 is constructed of a reflective material, such as a diffusely-reflective material (e.g., plastic) or a specularly-reflective material (e.g., metal), or a material covered with a diffusely- or specularly-reflective film or coating. In another embodiment, the light redirecting element 315 is constructed of a transparent or translucent material such as glass or plastic.

The embodiments of modular light-emitting panel assembly 200 to be described next with reference to FIGS. 16-18 reduce visibility of a seam between adjacent light guides by increasing the lateral spread of the intensity spike resulting from unwanted light extraction at the seams 245 between adjacent light guides 210. Increasing the lateral spread of the seam reduces the maximum of the intensity spike and therefore reduces the visibility of the seam.

Figure 16:
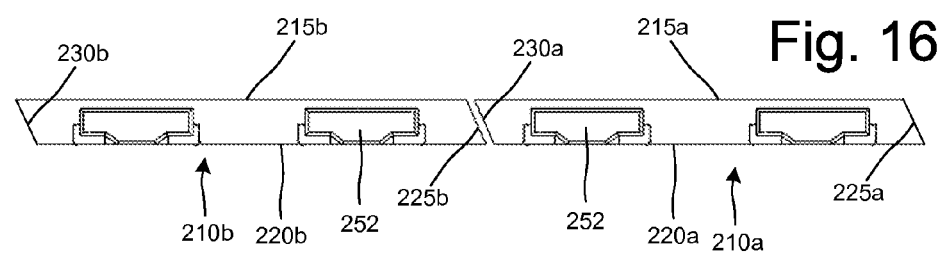
FIG. 16 is an exploded front view showing an example of a simplified embodiment of a modular light-emitting panel assembly that includes light guides having non-orthogonal side edges to reduce visibility of the seam when the panel assembly is illuminated.

FIG. 16 shows an embodiment in which the side edge 230a of light guide 210a is substantially planar and is oriented non-orthogonally to the back major surface 220a of light guide 210a, while the side edge 225b of the adjacent light guide 210b is substantially planar and is oriented relative to the back major surface 220b of light guide 210b at an angle that is complementary to the angle of the side edge 230a. Adjacent light guides having abutting side edges at complementary, non-orthogonal angles to the back major surfaces of the light guides perform the function of reducing visibility of the seam.

Figure 17:
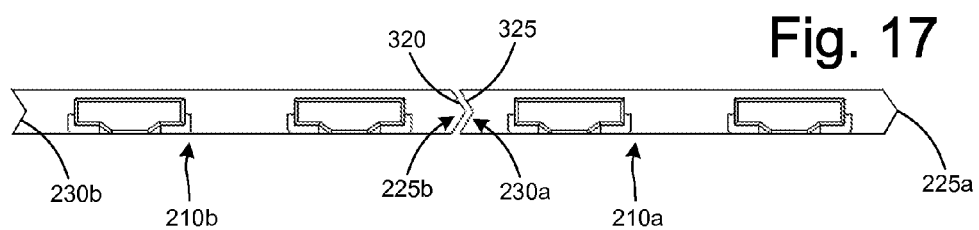
FIG. 17 is an exploded front view showing an example of a simplified embodiment of a modular light-emitting panel assembly having an example of non-planar side edges of the light guides.
Figure 18:
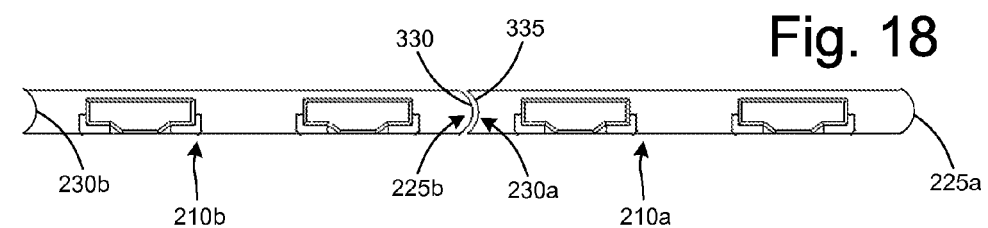
FIG. 18 is an exploded front view showing an example of a simplified embodiment of a modular light-emitting panel assembly having another example of non-planar side edges of the light guides.

FIG. 17 shows an embodiment in which the side edge 230a of light guide 210a has a V-shaped protrusion 320, while the side edge 225b of the adjacent light guide 210b has a complementary V-shaped recess 325 to receive and mate with the V-shaped protrusion 320 of side edge 230a of light guide 210a. FIG. 18 shows an embodiment in which the side edge 225b of light guide 210b has a convex protrusion 330, while the side edge 230a of adjacent light guide 210a has a complementary concave recess 335 to receive and mate with the convex protrusion 330 of the side edge 225b of the light guide 210b. Adjacent light guides having abutting side edges shaped to provide V-shaped or curved protrusions and complementary recesses perform the function of reducing visibility of the seam. The configurations of the side edges 230a, 225b of light guides 210a, 210b, respectively, described above with reference to FIGS. 16-18 spread seam 245a laterally in a direction orthogonal to the s. Increasing the lateral spread of the seam reduces the maximum of the intensity spike and therefore reduces the visibility of the seam. Thus, each of the above-described side edge configurations that overlap the light guides at the seam performs the function of reducing visibility of the seam.

Figure 19:
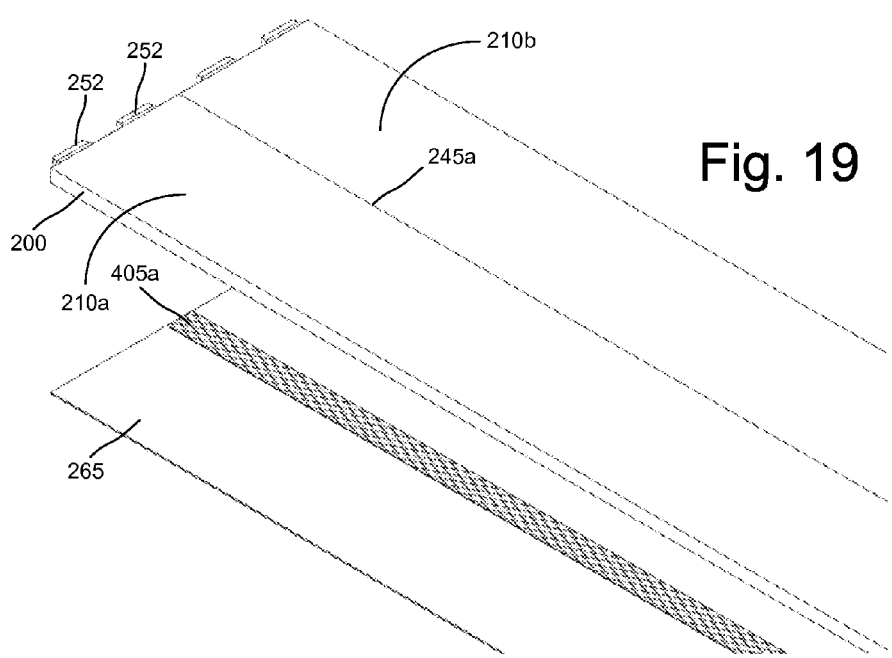
FIG. 19 is a perspective view showing part of an example of another simplified embodiment of a modular light-emitting panel assembly in which the back reflector includes a visibility-reducing pattern to reduce visibility of the seam when the panel assembly is illuminated.

FIG. 19 shows another embodiment in which a visibility-reducing pattern is located on one or more selected areas of back reflector 265 to reduce the visibility of seam 245a when panel assembly 200 is illuminated. In the example shown in FIG. 19 a visibility-reducing pattern 405a is located on a selected area of the surface of back reflector 265 facing light guides 210 and in alignment with seam 245a between light guides 210a and 210b. Visibility-reducing pattern 405a is configured to absorb and/or redirect unwanted light emitted from seam 245a towards back reflector 265. Without visibility-reducing pattern 405a, back reflector 265 would reflect such unwanted light towards the observer. Some embodiments of visibility-reducing pattern 405a are light-absorbing. In this case, visibility-reducing pattern 405a absorbs the unwanted light emitted from seam 245a, which reduces visibility of the unwanted light to the observer. Other embodiments of visibility-reducing pattern 405a are light-redirecting. Here light-redirecting means light scattering and/or light-redirecting in one or more specific directions. In this case, visibility-reducing pattern 405a redirects the unwanted light emitted from seam 245a in other directions that reduce visibility of the unwanted light to the observer. Such directions are non-orthogonal to the major surfaces of the light guides. Thus, back reflector 265 having a light absorbing pattern 405a or a light redirecting pattern 405a in alignment with seam 245a performs the function of reducing visibility of the seam. Although FIG. 19 shows back reflector 265 as having a single visibility-reducing pattern 405a located in alignment with seam 245a, back reflector 265 typically has a visibility-reducing pattern located in alignment with each of the seams 245.

Visibility-reducing pattern 405 can be produced in a variety of ways including, without limitation, pad printing, silk screen printing, ink jet printing, a heat transfer film process or another suitable process. Visibility-reducing pattern 405a may be printed on back reflector 265 using a wide spectrum of paints, inks, coatings, epoxies, or the like, ranging from glossy to matte and transparent to opaque in any combination, and may employ dithering and half-tone separation techniques to vary coverage. Visibility-reducing pattern 405a may include multiple layers that differ in index of refraction.

In an example, visibility-reducing pattern 405a is formed by appropriately texturing part of the tool used to mold back reflector 265 as a separate component or as an integral part of tray 205. In another example, light diverting pattern is formed by embossing after back reflector 265 has been formed as an individual component or as part of tray 205. Optionally, a reflective or light-absorbing coating applied to the pattern formed by molding or embossing to complete the production of visibility-reducing pattern 405a.

Visibility-reducing pattern 405a can include features that vary in density, size, shape (e.g., dots, polygons, squares, diamonds, ellipses, stars, randomly-varying shapes), color, opacity, index of refraction, absorptance, area coverage and/or another suitable property to divert the light emitted from seam 245a in a manner that reduces visibility of the seam. For example, by increasing the size and/or density of the features of visibility-reducing pattern 405a, the visibility-reducing pattern can be made to absorb more of the unwanted light emitted from seam 245a. This reduces visibility of the unwanted light output from seam 245a. Thus, back reflector 265 having a varying light absorbing pattern 405a or a varying light redirecting pattern 405a in alignment with seam 245a performs the function of reducing visibility of the seam. In another embodiment, visibility-reducing pattern 405 has a widthwise-varying absorptance having a maximum at a location in alignment with seam 245a and that decreases with increasing distance from the seam in a direction orthogonal to the length of the seam.

The features in visibility-reducing pattern 405a can also vary in density, size, shape (e.g., dots, polygons, squares, diamonds, ellipses, stars, randomly-varying shapes), color, opacity, index of refraction, absorptance, area coverage, and/or another suitable property widthwise and lengthwise (i.e., in directions orthogonal and parallel to the length of seam 245a) in visibility-reducing pattern 405a to vary the diversion of the unwanted light emitted from seam 245a. Typically, the intensity of the light in light guides 210a, 210b is greater closer to light sources 250 than further away from the light sources. Accordingly, a lengthways-varying visibility-reducing pattern may be used to adjust for such intensity variations in the light within the light guides (and, hence, in the intensity of the unwanted light emitted from the seam between adjacent light guides) to obtain a nominally-constant visibility of the unwanted light along the length of the seam. In one embodiment, the density and/or size of the features of visibility-reducing pattern 405a is decreased as the distance from light source 250 increases to provide a more-uniform intensity of the unwanted light emitted from seam 245a. In another embodiment, visibility-reducing pattern 405a increases in absorbance with increasing distance from light source 250 to provide a more-uniform output of unwanted light from seam 245a. Thus, back reflector 265 having, in alignment with seam 245a, a light absorbing pattern 405a or a light redirecting pattern 405a that varies lengthwise or widthwise or lengthwise and widthwise performs the function of reducing visibility of the seam.

Figure 20:
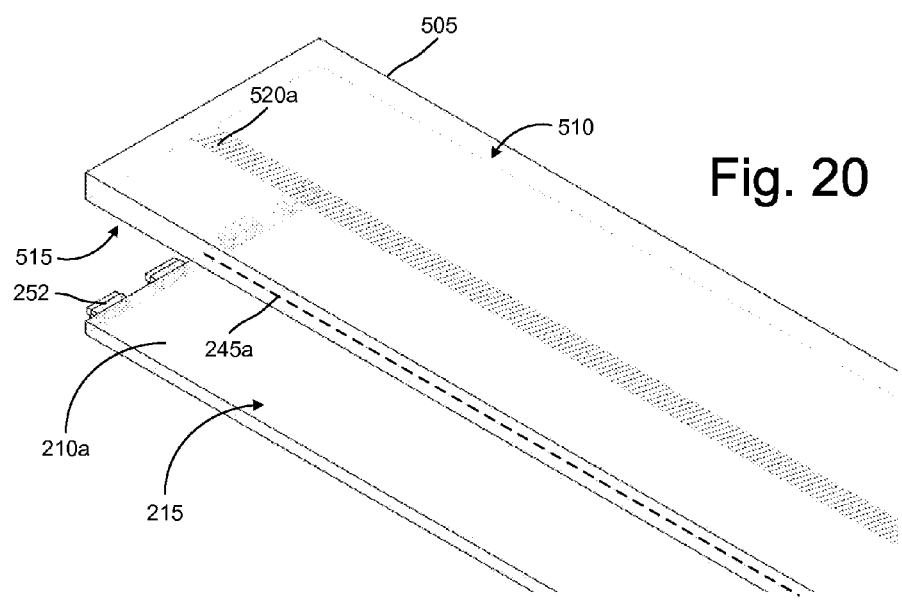
FIG. 20 is a perspective view showing part of an example of another simplified embodiment of a modular light-emitting panel assembly that includes a transparent plate juxtaposed with the front major surface of the light guides to reduce visibility of the seam when the panel assembly is illuminated. The transparent plate includes a pattern of light diverting elements aligned with the seam.

In another embodiment shown in FIG. 20, modular light-emitting panel assembly 200 includes a transparent plate 505 juxtaposed with the front major surface 215 of light guides 210. Transparent plate 505 has a front major surface 510 and a back major surface 515, which faces the front major surface 215 of light guides 210. In this example, transparent plate 505 includes a visibility-reducing pattern 520a in selected areas of the back major surface 515 of the transparent plate. In the example shown, a visibility-reducing pattern 520a is located on the back major surface 515 of transparent plate 505 in alignment with seam 245a. Visibility-reducing pattern 520a is configured to absorb and/or redirect unwanted light emitted from seam 245a towards the observer to other directions that reduce visibility of the unwanted light to the observer. Such directions are non-orthogonal to the major surfaces of the light guides. Transparent plate 505 is mounted in tray 205 (FIG. 1A) in a manner that causes it to apply pressure to light guides 210 in a direction orthogonal to the front major surface 215 of the light guides. The pressure assists in aligning the light guides in this orthogonal direction to reduce deviations from coplanarity of the front major surfaces 215 of the light guides. Such deviations would make the seam 245a highly visible. Thus, a transparent plate 505 juxtaposed with the front major surfaces 215 of light guides 210a, 210b that applies pressure to reduce deviations from coplanarity of front major surfaces 215a, 215b performs the function of reducing visibility of the seam.

In another embodiment, visibility-reducing pattern 520a is provided on the front major surface 510 of transparent plate 505 in alignment with seam 245a. In another embodiment, respective instances of visibility-reducing pattern 520a are provided on the front major surface 510 and the back major surface 515 of transparent plate 505 in alignment with seam 245a. Thus, a transparent plate 505 that is juxtaposed with the front major surface 215 of light guides 210a, 210b and that includes a visibility-reducing pattern 520a in alignment with seam 245a on the front major surface 510 thereof, or on the back major surface 515 thereof, or on both the front major surface and the back major surface thereof performs the function of reducing visibility of the seam.

In another embodiment, a visibility-reducing pattern similar to those just described is located on a diffuser plate, instead of on a transparent plate, in alignment with seam 245a. In another embodiment, a visibility-reducing pattern similar to those just described is located on a transparent film or a diffuser film, instead of on a transparent plate, in alignment with seam 245a. Thus, a diffuser plate, a diffuser film or a transparent film that is juxtaposed with the front major surface 215 of light guides 210a, 210b and that includes a visibility-reducing pattern in alignment with seam 245a on the front major surface thereof, or on the back major surface thereof, or on both the front major surface and the back major surface thereof performs the function of reducing visibility of the seam.

In another embodiment shown in FIG. 21, panel assembly 200 includes a transparent plate 505 having a visibility-reducing pattern 520a aligned with seam 245a juxtaposed with the front major surfaces 215 of light guides 210a, 210b, and a back reflector 265 having a visibility-reducing pattern 405a aligned with seam 245a juxtaposed with the back major surfaces 220 of light guides 210a, 210b. Thus, a transparent plate 505 juxtaposed with the front major surfaces 215 of light guides 210a, 210b that includes a visibility-reducing pattern 520a aligned with seam 245a on the front major surface 510 thereof, or on the back major surface 515 thereof, or on both the front major surface and the back major surface thereof and a back reflector 245 having a visibility-reducing pattern 405a aligned with seam 245a juxtaposed with the back major surfaces 220 of the light guides collectively perform the function of reducing visibility of the seam.

The seam visibility reduction techniques described herein may also be applied to seams between the abutted end edges of light guides arranged in a two-dimensional array.

Two or more of the above-described structures that perform the function of reducing visibility of the seam can be used in combination with each other to reduce visibility of the seam when panel assembly 200 is illuminated. For example, a film similar to film 305 described above with reference to FIGS. 8A and 8B interposed between the side edges 230a and 225b of light guides 210a and 210b, respectively, may be used in combination with a film strip similar to film strip 310 described above with reference to FIG. 9 covering seam 245a to reduce the visibility of seam 245a.

Because modular light-emitting panel assembly 200 is composed of light guides 210, each of which is edge lit by an independently-controllable light source 250, panel assembly 200 can be used to back light liquid crystal displays (LCDs) having advanced features. An LCD is an example of an array of light valves. The implementations of light valve arrays are known and may be back lit using embodiments of the modular light-emitting panel assembly described herein.

For example, the respective light source 250 edge lighting each light guide 210 in panel assembly 200 can be configured to provide active color correction. For example, active color correction refers to matching the spectra of the light edge lighting the light guides in the lighting assembly to prevent color differences that would make the modular structure of the lighting assembly apparent to the observer. To accomplish this, each light guide 210 includes a sensor (not shown) to sense the intensity and spectrum of the light in the light guide 210. Based on the intensity and spectrum sensed by the sensor, the light output of solid-state light emitters of different colors constituting the respective light source 250 edge lighting each light guide 210 can be controlled to change the intensity and spectrum of the light input to the light guide. In one example, the solid-state light emitters 252 constituting the light source 250 that edge lights each light guide 210 are controlled such that the intensity and spectrum of the light edge lighting the light guide is the same as the intensity and spectrum of the light edge lighting the other light guides. In another example, the solid-state light emitters 252 constituting the light source 250 edge lighting each light guide are controlled such that the spectrum of the light edge lighting the light guide conforms to a standard spectrum. In another example, the solid-state light emitters 252 constituting the light source 250 edge lighting each light guide are controlled such that the intensity and spectrum of the light edge lighting the light guide is optimized in accordance with the brightness and color represented by a video signal portion provided to a slice of the LCD back lit by light extracted from the light guide.

In an example, a common sensor is used to determine the spectrum of the light edge lighting all the light guides. In this case, a sample of light from each light guide is conveyed to the sensor though an optical device, such as an optical fiber or a light guide. In this embodiment, the light sampled from the light guides can be temporally separated from one another at the sensor by pulsing the light sources 250 edge lighting the respective light guides with an appropriate timing. Additionally or alternatively, the light samples from the light guides can be spatially separated from one another at the sensor by conveying the light sample from each light guide to the sensor by a separate optical fiber or a different portion of the light guide and using a segmented sensor with at least one segment per light guide. Alternatively, a non-segmented sensor can be used together with a mechanism that moves the sensor and optical fibers or light guide relative to one another. In addition, in an embodiment in which a light source 250 composed of multiple solid-state light emitters edge lights a single light guide, the sensor can sense a sample of light from each individual solid-state light emitter and corresponding individual adjustments to the light output of the light source can be made by pulsing the constituent solid-state light emitters with appropriate timing that temporally separates the light samples reaching the sensor from each solid-state light emitter.

Panel assembly 200 can also be configured to provide progressive illumination scanning for use with light valve arrays that employ progressive refresh scanning. Since light sources 250 illuminating the light guides 210 are independently controllable, the light sources 250 can be turned on and off to permit selective illumination of the light guides 210.

FIGS. 22A-22D show an example of a progressive illumination scanning sequence and FIGS. 23A-23D show another example of a progressive illumination scanning sequence that can be implemented using panel assembly 200. FIGS. 22A-22D and FIGS. 23A-23D show only parts of progressive illumination scanning sequences, but the remainder of the sequences can be deduced from the drawings and the description below. In the FIGS. 22A-22D and FIGS. 23A-23D, a light guide 210 whose respective light source 250 is turned on is shown in white. Further, although the example of panel assembly 200 shown in FIGS. 22A-22D and FIGS. 23A-23D has nine light guides 210, panel assembly 200 can have more or fewer light guides 210, as described above.

Figure 22A:
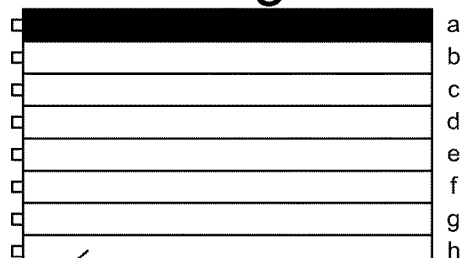
FIGS. 22A-22D are plan views showing part of an example of a progressive scanning sequence that can be implemented using the modular light-emitting panel assembly embodiments described herein.
Figure 22B:
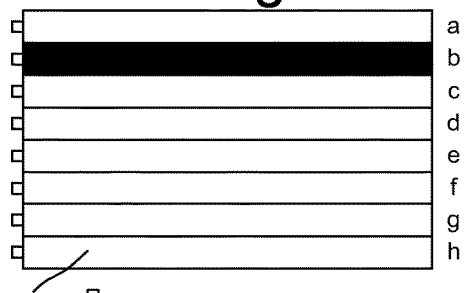
Figure 22C:
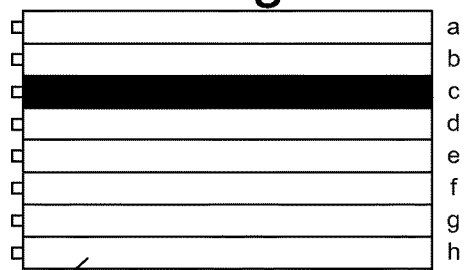
Figure 22D:
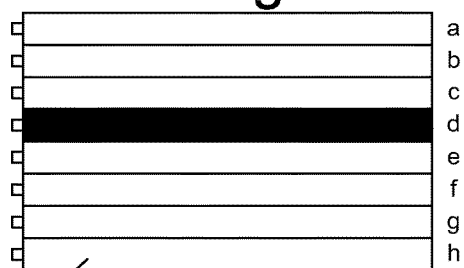

FIGS. 22A-22D show part of an example of a progressive illumination scanning sequence implemented using panel assembly 200. Initially, as shown in FIG. 22A, the light sources 250 of all the light guides 210 but light guide 210a are turned on. While light guide 210a is turned off, the slice of the LCD backlit by light guide 210a is refreshed. Next, as shown in FIG. 22B, the light source of light guide 210a turns back on and that of light guide 210b turns off, so that the light sources of all the light guides 210 but light guide 210b are turned on. While light guide 210b is turned off, the slice of the LCD backlit by light guide 210b is refreshed. Next, as shown in FIG. 22C the light source of light guide 210b turns back on and that of light guide 210c turns off, so that the light sources of all the light guides 210 but light guide 210c are turned on. While light guide 210c is turned off, the slice of the LCD backlit by light guide 210c is refreshed. Next, as shown in FIG. 22D the light source of light guide 210c turns back on and that of light guide 210d turns off, so that the light sources of all the light guides 210 but light guide 210d are turned on. While light guide 210d is turned off, the slice of the LCD backlit by light guide 210d is refreshed. The sequence continues in a similar manner until the respective light sources of light guides 210e-i have been sequentially turned off and the corresponding slices of the LCD have been refreshed. The sequence is then continuously repeated to provide progressive illumination scanning.

Figure 23A:
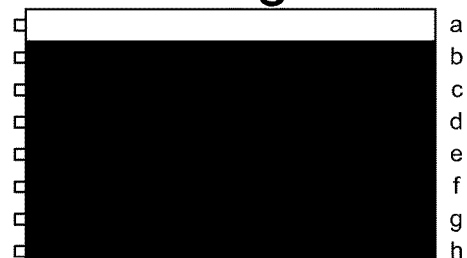
FIGS. 23A-23D are plan views showing part of another example of a progressive scanning sequence that can be implemented using the modular light-emitting panel assembly embodiments described herein.
Figure 23B:
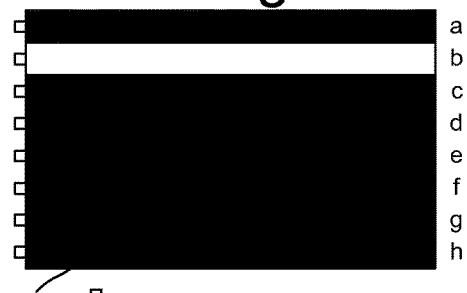
Figure 23C:
Figure 23D:
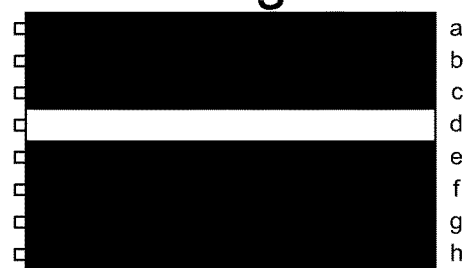

FIGS. 22A-22D show an example of a progressive illumination scanning sequence. Other progressive illumination sequences are possible. FIGS. 23A-23D show part of another example of a progressive illumination scanning sequence implemented using panel assembly 200. Initially, as shown in FIG. 23A, the light source 250 of only light guide 210a is turned on, and the respective light sources 250 of the remaining light guides 210 are turned off. While light guide 210a is turned on, the slice of the LCD backlit by light guide 210b is refreshed. Next, as shown in FIG. 23B, the light source of light guide 210b is turned on, the light source of light guide 210a is turned off, and the light sources of the remaining light guides 210 remain turned off. While light guide 210b is turned on, the slice of the LCD backlit by light guide 210c is refreshed. Next, as shown in FIG. 23C, the light source of light guide 210c is turned on, the light source of light guide 210b is turned off, and the light sources of the remaining light guides 210 remain turned off. While light guide 210c is turned on, the slice of the LCD backlit by light guide 210d is refreshed. Next, as shown in FIG. 23D, the light source of light guide 210d is turned on, the light source of light guide 210c is turned off, and the light sources of the remaining light guides 210 remain turned off. While light guide 210d is turned on, the slice of the LCD backlit by light guide 210e is refreshed. The sequence continues in a similar manner until the respective light sources of light guides 210e-i have been sequentially turned on and slices of the LCD that are illuminated subsequently have been refreshed. The sequence is then continuously repeated to provide progressive illumination scanning.

Figure 24:
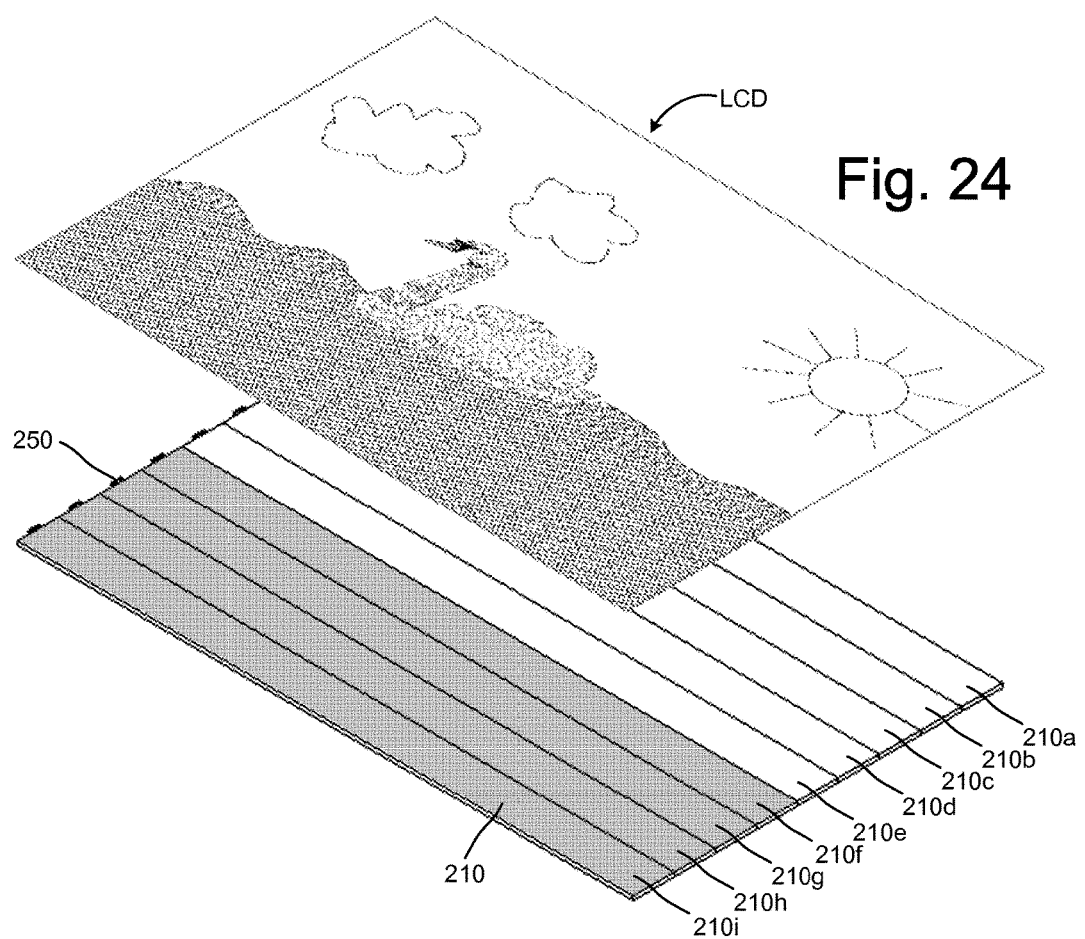
FIG. 24 is an exploded view showing an example of active dimming that can be implemented using the modular light-emitting panel assembly embodiments described herein.

Additionally, the panel assembly 200 can be configured to perform localized active dimming. Since the light sources 250 are independently controllable, the light source 250 edge lighting each of the light guides 210 can be dynamically controlled to control the intensity of light illuminating the respective light guide 210 depending on the brightness represented by the portion of the video signal displayed by the slice of the LCD backlit by the respective light guide. In an example, the light output of the light source 250 edge lighting a light guide 210 that back lights a slice of the LCD displaying a high-brightness portion of an image is increased, whereas the light output of the light source 250 edge lighting another of the light guides 210 that back lights a slice of the LCD that displays a low-brightness portion of the image is decreased. FIG. 24 shows an image in which the light output by light sources 250 to edge light guides 210f-i is decreased in intensity to display the darker water region of the image displayed by the LCD, whereas the light output by light sources 250 to edge light guides 210a-e is increased in intensity to display the brighter sky region of the image displayed by the LCD. In another example, when an image having a width/height aspect ratio greater than the width/height aspect ratio of the LCD is displayed, the light sources of the light guides 210 backlighting the dark slices of the LCD are turned off.

In addition to intensity, the spectrum of the light that edge lights each light guide 210 can be individually controlled depending on the chrominance represented by the portion of the video signal displayed the slice of the LCD backlit by the respective light guide. For example, when one or more slices of the image displayed by the LCD are rich in red, then in the light sources 250 that edge light the light guides 210 that back light such slices, the constituent solid-state light emitters that output red light can be controlled to increase the intensity of the red light to produce a more vibrant image.

Furthermore, panel assembly 200 can permit selective illumination, including sequential illumination, of solid-state light emitters 252 that generate light of each color. Alternatively, all of the light sources 250 can be turned on and off together to permit flashing of the entire panel assembly 200.

We claim:

1. A modular light-emitting panel assembly, comprising:
    a first light guide and a second light guide, each light guide having a light input edge with a greater cross-sectional width than thickness, opposed side edges, opposed major surfaces and a pattern of light extracting elements at at least one of the major surfaces, the first light guide juxtaposed with the second light guide with one of the side edges of the first light guide abutting one of the side edges of the second light guide at a seam; and
    a first light source and a second light source to edge light the first light guide and the second light guide, respectively, through the light input edges thereof such that light propagates along each light guide by total internal reflection at the major surfaces thereof for extraction from the light guide by the light extracting elements;
    wherein the abutting side edge of the first light guide is shaped to define a convex protrusion extending between the opposed major surfaces of the first light guide and the abutting side edge of the second light guide is shaped to define a complementary concave recess extending between the opposed major surfaces of the second light guide.

2. The panel assembly of claim 1, further comprising a strip of diffuser film located between the abutted side edges of the first light guide and the second light guide.

3. The panel assembly of claim 1, further comprising a strip of light absorption film located between the abutted side edges of the first light guide and the second light guide.

4. The panel assembly of claim 1, further comprising a strip of prism film located between the abutted side edges of the first light guide and the second light guide.

5. The panel assembly of claim 1, further comprising a film affixed to one or both of the abutted side edges of the first light guide and the second light guide.

6. The panel assembly of claim 1, further comprising a coating on one or both of the abutted side edges of the first light guide and the second light guide.

7. The panel assembly of claim 1, further comprising light reflective or refractive structures on one or both of the abutted side edges of the first light guide and the second light guide.

8. The panel assembly of claim 1, further comprising a light redirecting element offset from the seam in a direction orthogonal to the major surfaces, the light redirecting element configured to redirect at least a portion of light emitted from the seam in other directions non-orthogonal to the major surfaces.

9. A modular light-emitting panel assembly, comprising:
    a first light guide and a second light guide, each light guide having a light input edge with a greater cross-sectional width than thickness, opposed side edges, opposed major surfaces and a pattern of light extracting elements at at least one of the major surfaces, the first light guide juxtaposed with the second light guide with one of the side edges of the first light guide abutting one of the side edges of the second light guide at a seam and the major surfaces nominally coplanar; and
    a first light source and a second light source to edge light the first light guide and the second light guide, respectively, through the light input edges thereof such that light propagates along each light guide by total internal reflection at the major surfaces thereof for extraction from the light guide by the light extracting elements;
    wherein the abutting side edges of the light guides are configured to spread the seam in a lateral direction parallel to a direction defined by an intersection of the major surfaces and the light input edges to reduce visibility of the seam when the light sources illuminate the light guides.

10. The panel assembly of claim 9, wherein the abutting side edges of the light guides are planar and oriented at complementary, non-orthogonal angles to the major surfaces of the light guides.

11. The panel assembly of claim 9, wherein the abutting side edges of the light guides are shaped to define a V-shaped protrusion and a complementary V-shaped recess, respectively.

12. The panel assembly of claim 1, further comprising optical-grade adhesive bonding the abutted side edges to one another, the optical-grade adhesive equal in index of refraction to the light guides.

13. The panel assembly of claim 1, additionally comprising a diffuser film affixed to the major surfaces of the light guides and covering the seam.

14. The panel assembly of claim 1, wherein at least a portion of at least one of the light input edges comprises refractive surfaces to spread the light from the light source in the width direction.

15. A modular light-emitting panel assembly, comprising:
a first light guide and a second light guide, each light guide having a light input edge with a greater cross-sectional width than thickness, opposed side edges, opposed major surfaces and a pattern of light extracting elements at at least one of the major surfaces, the first light guide juxtaposed with the second light guide with one of the side edges of the first light guide abutting one of the side edges of the second light guide at a seam;
a first light source and a second light source to edge light the first light guide and the second light guide, respectively, through the light input edges thereof such that light propagates along each light guide by total internal reflection at the major surfaces thereof for extraction from the light guide by the light extracting elements; and
a visibility-reducing pattern adjacent the seam configured to reduce visibility of the seam when the light sources illuminate the light guides, the visibility-reducing pattern having a density that decreases with increasing distance from the light input edge.

16. The panel assembly of claim 15, wherein:
the panel assembly additionally comprises a tray to receive and support the light guides; and
the visibility-reducing pattern is on the tray adjacent the seam.

17. The panel assembly of claim 15, wherein:
the light input edge of each light guide is a first light input edge, and each light guide additionally has a second light input edge opposite the light input edge; and
the modular light-emitting panel assembly additionally comprises a third light source and a fourth light source to edge light the first light guide and the second light guide, respectively, through the second light input edges thereof such that light propagates along each light guide by total internal reflection at the major surfaces thereof opposite in direction to the light from the first light source and the second light source;
wherein the density of the visibility-reducing pattern decreases with increasing distance from the first light input edges and from the second light input edges to a minimum mid-way between the first light input edges and the second light input edges.

18. A lighting fixture, comprising
a modular light-emitting panel assembly in accordance with claim 1; and
a structure to mount the lighting assembly to a one of a stand, a wall and a ceiling.

19. The panel assembly of claim 1, wherein the major surfaces of the first light guide and the second light guide are nominally coplanar.

20. The panel assembly of claim 15, wherein the major surfaces of the first light guide and the second light guide are nominally coplanar.

* * * * *